United States Patent
Cardonha et al.

(10) Patent No.: US 9,798,742 B2
(45) Date of Patent: Oct. 24, 2017

(54) SYSTEM AND METHOD FOR THE IDENTIFICATION OF PERSONAL PRESENCE AND FOR ENRICHMENT OF METADATA IN IMAGE MEDIA

(71) Applicant: International Business Machines Corporation, Armonk, NY (US)

(72) Inventors: Carlos H. Cardonha, Sao Paulo (BR); Nicole B. Sultanum, Sao Paulo (BR)

(73) Assignee: International Business Machines Corporation, Armonk, NY (US)

(*) Notice: Subject to any disclaimer, the term of this patent is extended or adjusted under 35 U.S.C. 154(b) by 63 days.

(21) Appl. No.: 14/977,189

(22) Filed: Dec. 21, 2015

(65) Prior Publication Data
US 2017/0177621 A1   Jun. 22, 2017

(51) Int. Cl.
*G06F 17/30* (2006.01)
*G06N 5/04* (2006.01)

(52) U.S. Cl.
CPC .... *G06F 17/30247* (2013.01); *G06F 17/3028* (2013.01); *G06F 17/30265* (2013.01); *G06F 17/30991* (2013.01); *G06N 5/048* (2013.01)

(58) Field of Classification Search
CPC ......... G06F 17/30247; G06F 17/30256; G06F 17/30864; G06F 17/30867; G06F 17/30268
See application file for complete search history.

(56) References Cited

U.S. PATENT DOCUMENTS

| | | | |
|---|---|---|---|
| 6,549,922 B1 | 4/2003 | Srivastava et al. |
| 7,372,976 B2 | 5/2008 | Rhoads et al. |
| 7,996,431 B2 | 8/2011 | Coffman et al. |
| 8,121,342 B2 | 2/2012 | Davis et al. |

(Continued)

FOREIGN PATENT DOCUMENTS

| | | |
|---|---|---|
| EP | 2143013 | 10/2008 |
| EP | 2518978 A2 | 10/2012 |

(Continued)

OTHER PUBLICATIONS

Ahern, Shane, Simon King, and Marc Davis. "MMM2: mobile media metadata for photo sharing." Proceedings of the 13th annual ACM international conference on Multimedia. ACM, 2005.*

(Continued)

*Primary Examiner* — Nan Hutton
(74) *Attorney, Agent, or Firm* — Scully, Scott, Murphy & Presser, PC; Louis J. Percello, Esq.

(57) ABSTRACT

A method and system for the identification of personal presence and enrichment of metadata in image media is disclosed. The method includes obtaining user presence information for user images. Feature extraction is performed on the images and media databases are searched for images based on the presence information, which includes filtering based on known metadata and filtering based on the feature extraction. The user confirms their presence in the filtered images and the user provides new metadata known to the user for the images. The system then infers metadata for the filtered images based on the new metadata and presents the (Continued)

inferred metadata to the user. The user validates the inferred metadata and the inferred metadata confirmed to be valid is stored.

19 Claims, 6 Drawing Sheets

(56) References Cited

U.S. PATENT DOCUMENTS

| | | | |
|---|---|---|---|
| 8,368,754 B2 | 2/2013 | Flores et al. | |
| 8,447,785 B2 | 5/2013 | Liu et al. | |
| 8,452,769 B2 | 5/2013 | Altaf et al. | |
| 8,533,265 B2 | 9/2013 | Bardsley et al. | |
| 8,533,306 B2 | 9/2013 | Nguyen et al. | |
| 8,571,581 B2 | 10/2013 | Lee et al. | |
| 8,611,339 B2 | 12/2013 | Jana et al. | |
| 8,661,017 B2 | 2/2014 | Wang et al. | |
| 8,861,804 B1* | 10/2014 | Johnson | G06K 9/00221 382/118 |
| 9,336,435 B1* | 5/2016 | Ozog | G06K 9/00288 |
| 2003/0135582 A1 | 7/2003 | Allen et al. | |
| 2005/0104976 A1 | 5/2005 | Currans | |
| 2011/0010638 A1 | 1/2011 | Fox et al. | |
| 2012/0122476 A1 | 5/2012 | Lee et al. | |
| 2012/0173573 A1 | 7/2012 | Lance et al. | |
| 2013/0036171 A1 | 2/2013 | Gilbert | |
| 2013/0159273 A1 | 6/2013 | Orr et al. | |
| 2013/0332451 A1 | 12/2013 | Camplejohn et al. | |
| 2014/0033092 A1 | 1/2014 | Bardsley et al. | |
| 2014/0080428 A1* | 3/2014 | Rhoads | G06F 17/30241 455/88 |
| 2014/0095598 A1 | 4/2014 | Schornack et al. | |
| 2014/0129544 A1 | 5/2014 | Haugen et al. | |
| 2014/0201227 A1 | 7/2014 | Hamilton-Dick et al. | |
| 2014/0280390 A1 | 9/2014 | Bubash et al. | |
| 2015/0070516 A1 | 3/2015 | Shoemake et al. | |
| 2015/0104060 A1 | 4/2015 | Dolson et al. | |

FOREIGN PATENT DOCUMENTS

| | | |
|---|---|---|
| WO | 2008121988 A1 | 10/2008 |
| WO | 2012092150 A2 | 7/2012 |
| WO | 2012171073 A1 | 12/2012 |
| WO | 2014052260 A2 | 4/2014 |
| WO | 2014113512 A1 | 7/2014 |

OTHER PUBLICATIONS

Sarvas, Risto, et al. "Metadata creation system for mobile images." Proceedings of the 2nd international conference on Mobile systems, applications, and services. ACM, 2004.*
Davis, Marc. "Mobile media metadata: metadata creation system for mobile images." Proceedings of the 12th annual ACM international conference on Multimedia. ACM, 2004.*
Peternel et al.; "Using Presence Information for an Effective Collaboration", IEEE, Proceedings CSNDSP08, 2008, pp. 119-123.
Brok et al.; "Enabling New Services by Exploiting Presence and Context Information in IMS", Bell Labs Technical Journal 10(4), Lucent Technologies Inc., 2006, pp. 83-100.
Lu et al., "Surpassing Human-Level Face Verification Performance on LFW with GaussianFace" (arxiv.org/abs/1404.3840), Dept. of Information Engineering, The Chinese University of Hong Kong, Dec. 20, 2014, pp. 1-13.
Smiley, David, "Geospatial Search: Geospatial Search Using Geohash Prefixes", (http://www.basistech.com/wp-content/uploads/2014/06/oss-2011-smiley-geospatial-search.pdf), Jun. 13, 2011, pp. 1-28.
Huang, et al., "Image Indexing Using Color Correlograms", Computer Vision and Pattern Recognition, Jun. 17, 1997, Proceedings IEEE Computer Society, pp. 1-7.
Carpenter, et al., "The Art of Adaptive Pattern Recognition by a Self-Organizing Neural Network", Computer 21:77-88, Aug. 1987, pp. 1-27.

* cited by examiner

SYSTEM AND METHOD FOR THE IDENTIFICATION OF PERSONAL PRESENCE AND FOR ENRICHMENT OF METADATA IN IMAGE MEDIA

BACKGROUND OF THE INVENTION

This disclosure is generally directed to image identification and more particularly to the identification of personal presence and enrichment of metadata in image media, such as web media.

In the midst of the digital age, people are more concerned about security and privacy than ever. In attempting to protect personal data, many avoid participating in social media websites. Performing actions on the web, such as checking-in locations, posting pictures of a leisure trip, and even personal tastes can provide strangers and malicious individuals with information that can potentially be used negatively. Nonetheless, this attitude isn't necessarily shared by all. Traces of one's presence can be found through other people's postings. While at a party, one might add a picture of a friend attending the event and tag the friend in it. In this case, the friend will be notified and might take appropriate action (e.g. ask the friend to remove the picture). But often, such events are completely out of one's control. For example, a complete stranger might take a picture in a park, and a people unknown to the taker might end up appearing in picture. In such cases, one might never know that their presence was captured at that moment, since chances are one will never meet this person, nor come across this specific content. Given the unstructured aspect of this information, automatically extracting evidence of one's presence is also complex. On top of that, large amounts of media are generated every day with little or no metadata associated to it to facilitate the search, making it an even more challenging task.

SUMMARY OF THE INVENTION

One embodiment of this disclosure is directed to a method for the identification of personal presence and enrichment of metadata in image media. The method includes obtaining from a user time and location information of the presence of the user at a location and storing one or more images obtained from the user in an image database. The method also includes performing feature extraction on the one or more user obtained images and storing the extracted features in a features database. The features database could be a separate location in the image database or a separate database.

The method further includes searching one or more media databases for image media based on the location and time information. The searching includes filtering the image media based on known metadata of the image media that matches the location and time information to provide first filtered image media. The searching also includes filtering the image media based on the feature extraction on the one or more user obtained images to provide second filtered image media and storing the first and second filtered image media in the image database.

Then, the method next includes presenting to the user the first and second filtered media and receiving an input from the user indicating whether or not the user can confirm the presence of the user in the first filtered image media. Thereafter, the method includes receiving from the user new metadata for the first filtered image media and receiving an input from the user indicating whether or not the user can confirm the presence of the user in the second filtered image media. The method also includes receiving from the user new metadata for the second filtered image media and storing the new metadata for the first and second filtered image media in the image database.

The method further includes inferring metadata for the first and second filtered image media in the image database based on the new metadata, presenting the inferred metadata for the first and second filtered image media to the user, receiving an input from the user indicating whether or not the user can confirm the validity of the inferred metadata for the first and second filtered image media and storing in the image database the inferred metadata for the first and second filtered image media confirmed by the user to be valid.

In one embodiment, obtaining from a user time and location information of the presence of the user at a location includes obtaining tracking information from a mobile device in the possession of the user and searching one or more media databases includes searching databases identified by the user. In another embodiment filtering the image media based on the feature extraction includes performing image recognition and the method further includes presenting a message to the user indicating the presence of the user in the second filtered image media as a result of the image recognition.

In one embodiment, performing feature extraction includes generating a classifier for each extracted feature using an unsupervised learning algorithm and the method further includes applying the classifier to a newly stored image obtained from the user, the newly stored image having at least location metadata, retrieving a set of neighbor images from the image database based on the location metadata of the newly stored image, inferring metadata for the newly stored image from metadata of the set of neighbor images, presenting the inferred metadata for the newly stored image to the user, receiving an input from the user indicating whether or not the user can confirm the validity of the new metadata for the newly stored image and storing in the image database the inferred metadata for the newly stored image confirmed by the user to be valid.

One embodiment is directed to a non-transitory article of manufacture tangibly embodying computer readable instructions, which when implemented, cause a computer to perform the steps of a method for the identification of personal presence and enrichment of metadata in image media stored in a image database, in which the method includes obtaining from a user time and location information of the presence of the user at a location and storing one or more images obtained from the user in an image database. The method also includes performing feature extraction on the one or more user obtained images and storing the extracted features in a features database. The features database could be a separate location in the image database or a separate database.

The computer readable instructions cause the computer to further perform searching one or more media databases for image media based on the location and time information. The searching includes filtering the image media based on known metadata of the image media that matches the location and time information to provide first filtered image media. The searching also includes filtering the image media based on the feature extraction on the one or more user obtained images to provide second filtered image media and storing the first and second filtered image media in the image database.

The computer readable instructions cause the computer to further perform presenting to the user the first and second filtered media and receiving an input from the user indicating whether or not the user can confirm the presence of the user in the first filtered image media. Thereafter, the method includes receiving from the user new metadata for the first filtered image media and receiving an input from the user indicating whether or not the user can confirm the presence of the user in the second filtered image media. The method also includes receiving from the user new metadata for the second filtered image media and storing the new metadata for the first and second filtered image media in the image database.

The computer readable instructions cause the computer to further perform inferring metadata for the first and second filtered image media in the image database based on the new metadata, presenting the inferred metadata for the first and second filtered image media to the user, receiving an input from the user indicating whether or not the user can confirm the validity of the inferred metadata for the first and second filtered image media and storing in the image database the inferred metadata for the first and second filtered image media confirmed by the user to be valid.

One embodiment is directed to a computer system for the identification of personal presence and enrichment of metadata in image media stored in an image database, the computer system includes one or more computer processors, one or more non-transitory computer-readable storage media, program instructions, stored on the one or more non-transitory computer-readable storage media, which when implemented by the one or more processors, cause the computer system to perform the steps of obtaining from a user time and location information of the presence of the user at a location and storing one or more images obtained from the user in an image database. The method also includes performing feature extraction on the one or more user obtained images and storing the extracted features in a features database. The features database could be a separate location in the image database or a separate database.

The program instructions cause the computer to further perform searching one or more media databases for image media based on the location and time information. The searching includes filtering the image media based on known metadata of the image media that matches the location and time information to provide first filtered image media. The searching also includes filtering the image media based on the feature extraction on the one or more user obtained images to provide second filtered image media and storing the first and second filtered image media in the image database.

The program instructions cause the computer to further perform presenting to the user the first and second filtered media and receiving an input from the user indicating whether or not the user can confirm the presence of the user in the first filtered image media. Thereafter, the method includes receiving from the user new metadata for the first filtered image media and receiving an input from the user indicating whether or not the user can confirm the presence of the user in the second filtered image media. The method also includes receiving from the user new metadata for the second filtered image media and storing the new metadata for the first and second filtered image media in the image database.

The program instructions cause the computer to further perform inferring metadata for the first and second filtered image media in the image database based on the new metadata, presenting the inferred metadata for the first and second filtered image media to the user, receiving an input from the user indicating whether or not the user can confirm the validity of the inferred metadata for the first and second filtered image media and storing in the image database the inferred metadata for the first and second filtered image media confirmed by the user to be valid.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF PREFERRED EMBODIMENTS

A method and system for the identification of personal presence and enrichment of metadata in image media is disclosed. The method includes obtaining user presence information for user images. Feature extraction is performed on the images and media databases are searched for images based on the presence information, which includes filtering based on known metadata and filtering based on the feature extraction. The user confirms their presence in the filtered images and the user provides new metadata known to the user for the images. The system then infers metadata for the filtered images based on the new metadata and presents the inferred metadata to the user. The user validates the inferred metadata and the inferred metadata confirmed to be valid is stored.

The system and method in one embodiment permits the identification of one's web presence in public social media and databases, as well as restricted social media accessible to this user, given the time/locations this person has been to. In addition, the system and method provides the augmentation of metadata in media using information inferred/informed by users of the identification system.

A user's location can be collected through a mobile device, for example, smart phone, smart watch. GPS device and stored with a timestamp in a secure server. This location/time is used to locate content posted in social media sites and generated at that approximate location and that approximate time. Most cameras and camera-enabled devices nowadays are able to associate a geographical location to photos, which then can be paired to a user's location/time. This can be used to search for media, such as pictures and video, generated at the specified location, posted in a set of online social media websites and other websites, for example, Twitter®, Facebook®, Instagram®, Flickr® and others. When tracking isn't possible, for example, when traveling overseas with no mobile signal, users can provide info to the system on places they have been. After a pipeline of filterings and image recognition, that can rely on a personal database of photos from the user to aid the processing, users can in turn mark whether that picture indeed contains their presence or not, which in turn helps train and tune the recognition algorithms. Alternatively, users can also volunteer more information about pictures they encounter, having their presence on them or not, that can be used to anonymously fill-in metadata for that media and subsequently facilitate media searches for those items in the future.

The user provides personal data, for example pictures, hometown, work location, locations of travel with time periods, social network information, time-located geolocation, either directly or indirectly through tracking mechanisms such as a mobile user tracker found for example on a mobile device or a smart watch, that registers user location within fixed intervals. Ideally, the system will know exactly where the user was at each moment of her life.

The system and method accesses a multitude of databases containing searchable media, with or without associated metadata. The user might also provide access to restricted databases that she has access to. User might also want to remove certain databases from the search.

The system and method performs search operations on the list of accessible databases in several ways. In a contextual search, structured information provided by the user, time-located geolocation, social network proximity, etc., is used to reduce the search space. Thus, media can be either included due to clear match or excluded due to clear mismatch. Insufficient metadata, such as the system knows that the picture is from the same country as the user, but nothing more specific than that, can generate large sets of images with low probability of matching. To efficiently handle these media for subsequent processing, algorithms, such as various known machine learning algorithms are used to filter the media. Filtered media is submitted to image processing algorithms for recognition. The system and method returns filtered results to the user. Optionally, the system indicates which filtering criteria were used to reach that photo, for example photo on particular social media site from a friend of friend where the user appears as well.

The user provides feedback to the system, indicating if she is present in the returned pictures.

Feedback may be enriched by complementary information provided by the user, for example, where that picture was taken, even if the user is not in it. The system and method incorporates feedback provided by the user to help tune the machine learning algorithms. The system and method may also use the newly provided metadata in order to infer metadata for other photos. For example, after verifying that a picture was taken in a city, all the pictures belonging to a same album might have been taken at the same location as well.

Figure 1A:
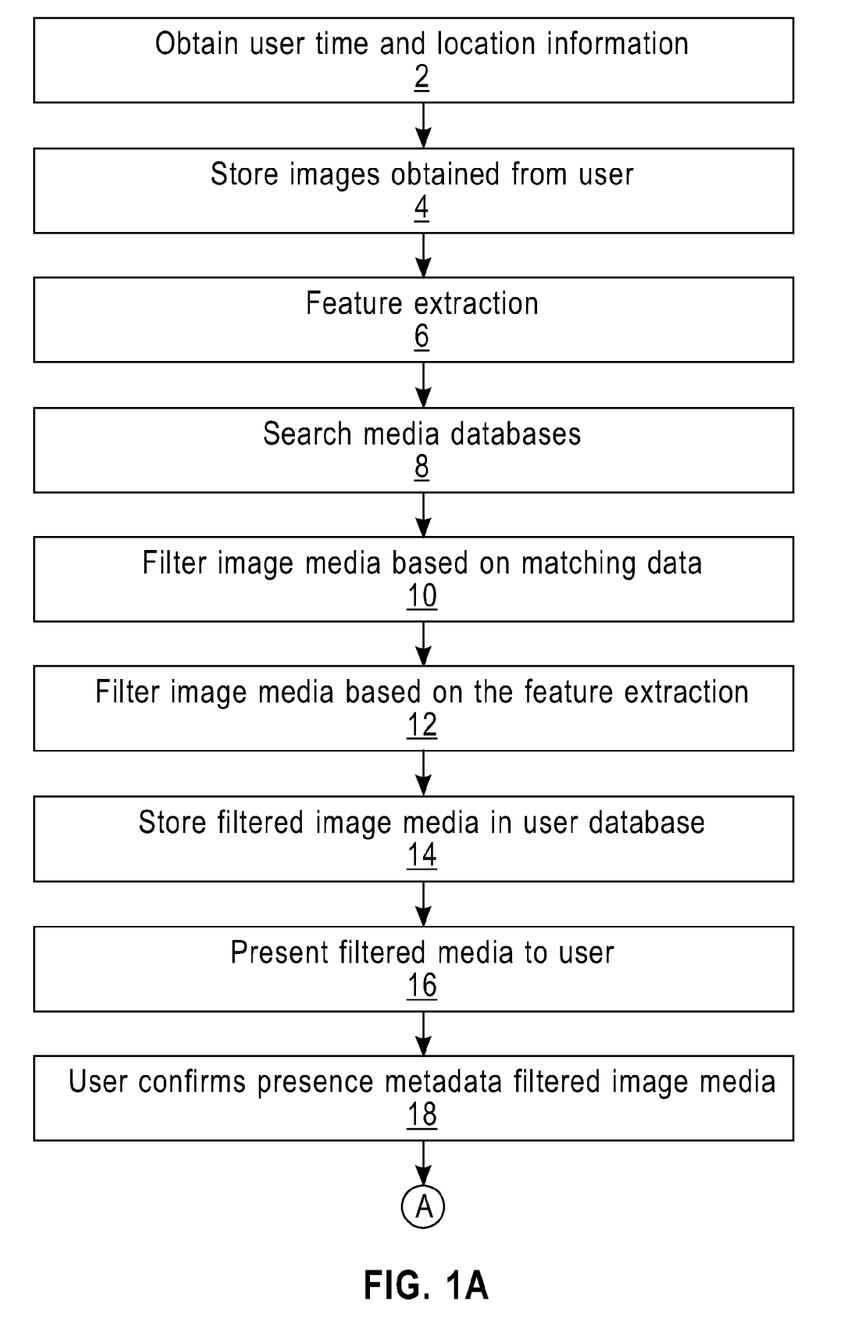
FIG. 1A is a flow chart of several steps of one embodiment of the method of the invention.
Figure 1B:
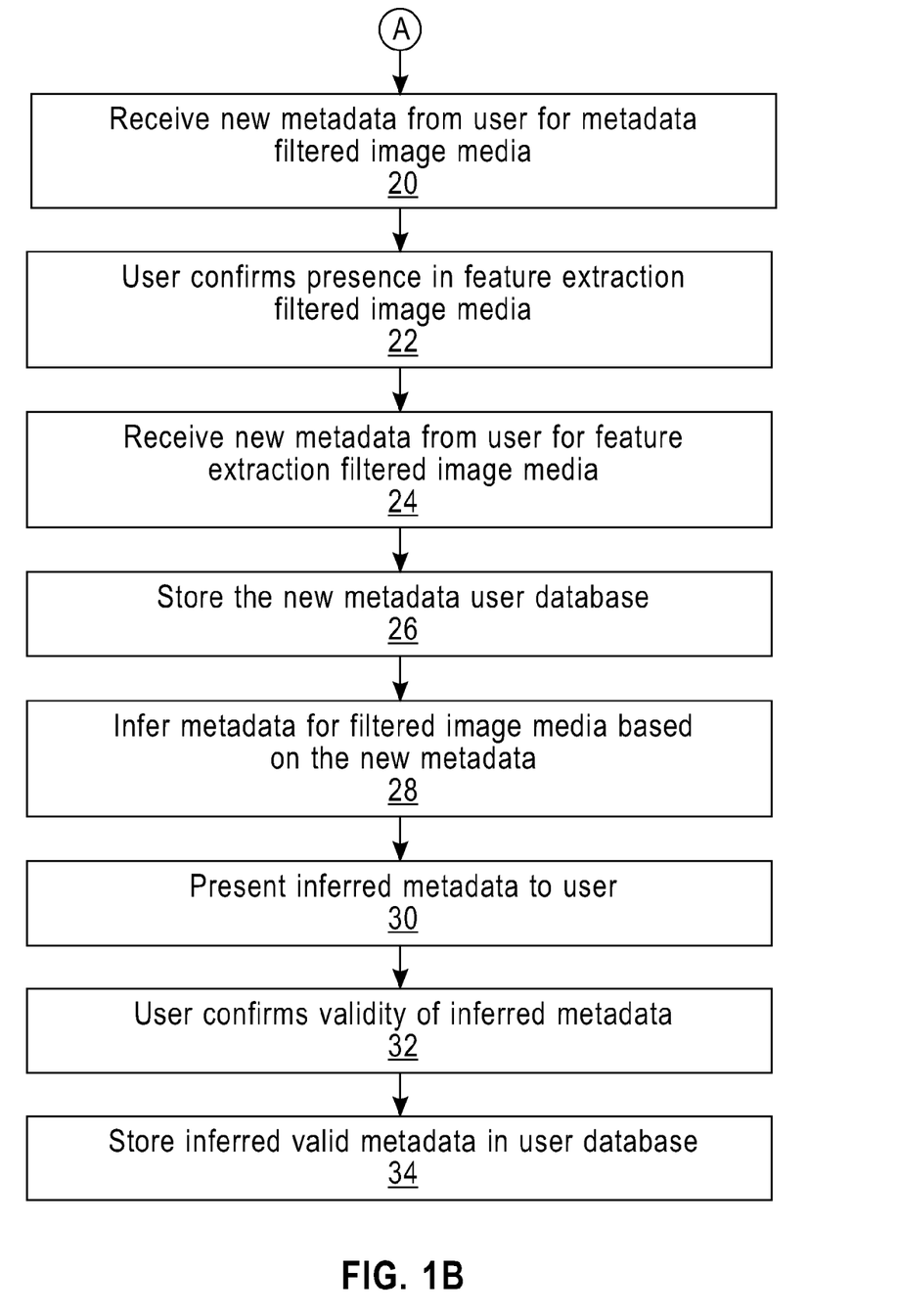
FIG. 1B is a flow chart of several further steps of one embodiment of the method of the invention.

As shown in FIGS. 1A and 1B, one embodiment of the method for the identification of personal presence and enrichment of metadata in image media start at step 2 of obtaining from a user time and location information of the presence of the user at a location and at step 4 storing one or more images obtained from the user in an image database. The method also includes at step 6 performing feature extraction on the one or more user obtained images and storing the extracted features in a features database. The features database could be a separate location in the image database or a separate database.

The method further includes at step 8 searching one or more media databases for image media based on the location and time information. The searching includes at step 10 filtering the image media based on known metadata of the image media that matches the location and time information to provide first filtered image media. The searching also includes at step 12 filtering the image media based on the feature extraction on the one or more user obtained images to provide second filtered image media and storing at step 14 the first and second filtered image media in the image database.

The method next includes presenting to the user the first and second filtered media at step 16 and receiving an input from the user indicating whether or not the user can confirm the presence of the user in the first filtered image media at step 18. Thereafter, the method includes at step 20 receiving from the user new metadata for the first filtered image media and at step 22 receiving an input from the user indicating whether or not the user can confirm the presence of the user in the second filtered image media. The method also includes at step 24 receiving from the user new metadata for the second filtered image media and storing the new metadata for the first and second filtered image media in the image database at step 26.

The method further includes at step 28 inferring metadata for the first and second filtered image media in the image database based on the new metadata, presenting the inferred metadata for the first and second filtered image media to the user at step 30, receiving an input from the user indicating whether or not the user can confirm the validity of the inferred metadata for the first and second filtered image media at step 32 and storing in the image database the inferred metadata for the first and second filtered image media confirmed by the user to be valid at step 34. This inference can also be based on similarities between pictures. For example, if picture A shows the Eiffel Tower and has Paris as metadata, an image recognition algorithm may detect similarities with a picture B which also contains the Eiffel Tower but does not have location metadata. In this case, the inference could involve metadata that has been associated with picture A previously, and not necessarily in the current session. But still, the system would ask users to validate the inferred metadata.

In one embodiment, obtaining from a user time and location information of the presence of the user at a location includes obtaining tracking information from a mobile device in the possession of the user and searching one or more media databases includes searching databases identified by the user. In another embodiment filtering the image media based on the feature extraction includes performing image recognition and the method further includes presenting a message to the user indicating the presence of the user in the second filtered image media as a result of the image recognition.

In one embodiment, identification of relevant images is done both by structured filters, such as, time and geo-location as provided by a user tracking device or a user-informed event, and unstructured filters, using images. In the latter case, images go through an image feature extraction step in order to characterize these images through a description vector, which in turn is used to place each of these images in a searchable feature space using an image classifier. These images can then be grouped and clustered according to their relative distances in the feature space.

Figure 2:
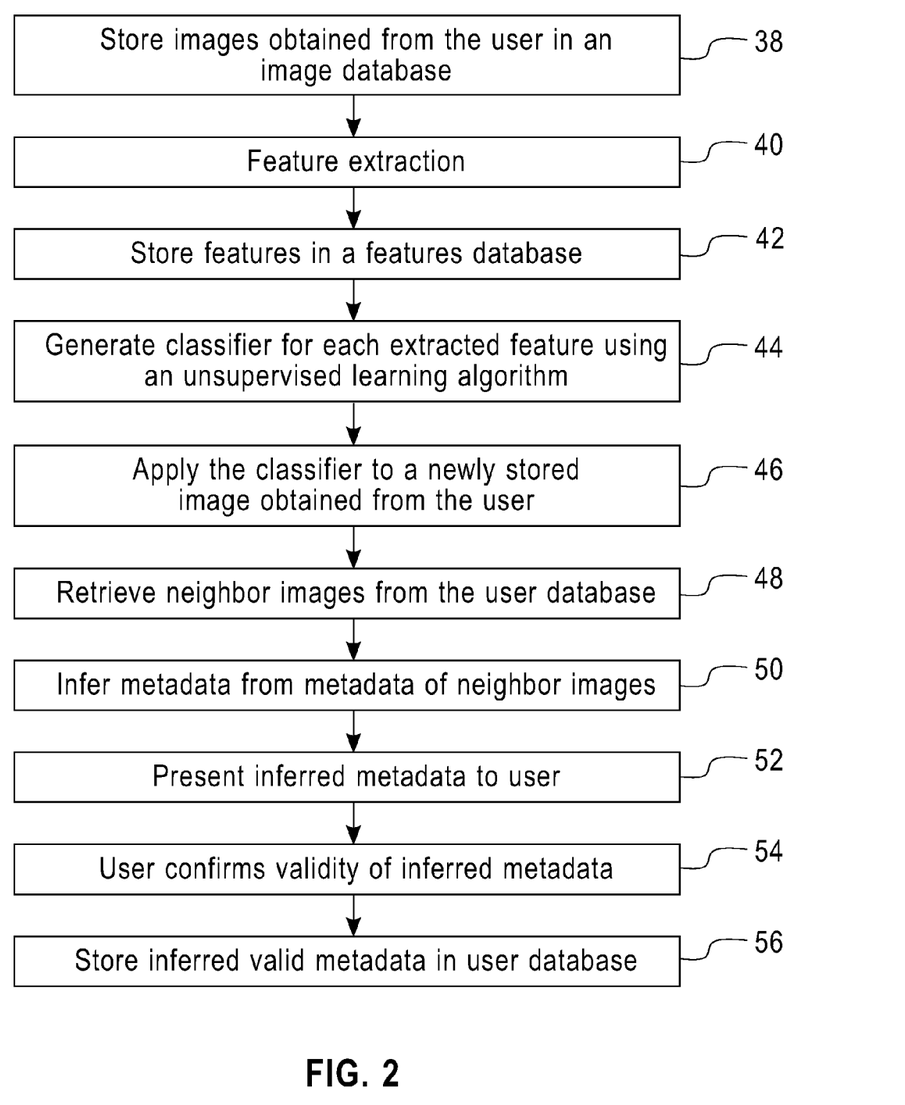
FIG. 2 is a flow chart of another embodiment of the method of the invention.

As shown in FIG. 2, images obtained from a user are stored in a user database at step 38. Feature extraction is performed at step 40 and the features are stored at step 42. A classifier for each extracted feature using an unsupervised learning algorithm is generated at step 44 and the classifier is applied to a newly stored image obtained from the user at step 46. The newly stored image has at least location metadata. At step 48 a set of neighbor images is retrieved from the image database based on the location metadata of the newly stored image. Metadata is inferred for the newly stored image from metadata of the set of neighbor images at step 50. Thereafter, the method includes presenting the inferred metadata for the newly stored image to the user at step 52, receiving an input from the user indicating whether or not the user can confirm the validity of the new metadata for the newly stored image at step 54 and storing in the image database the inferred metadata for the newly stored image confirmed by the user to be valid at step 56.

Figure 3:
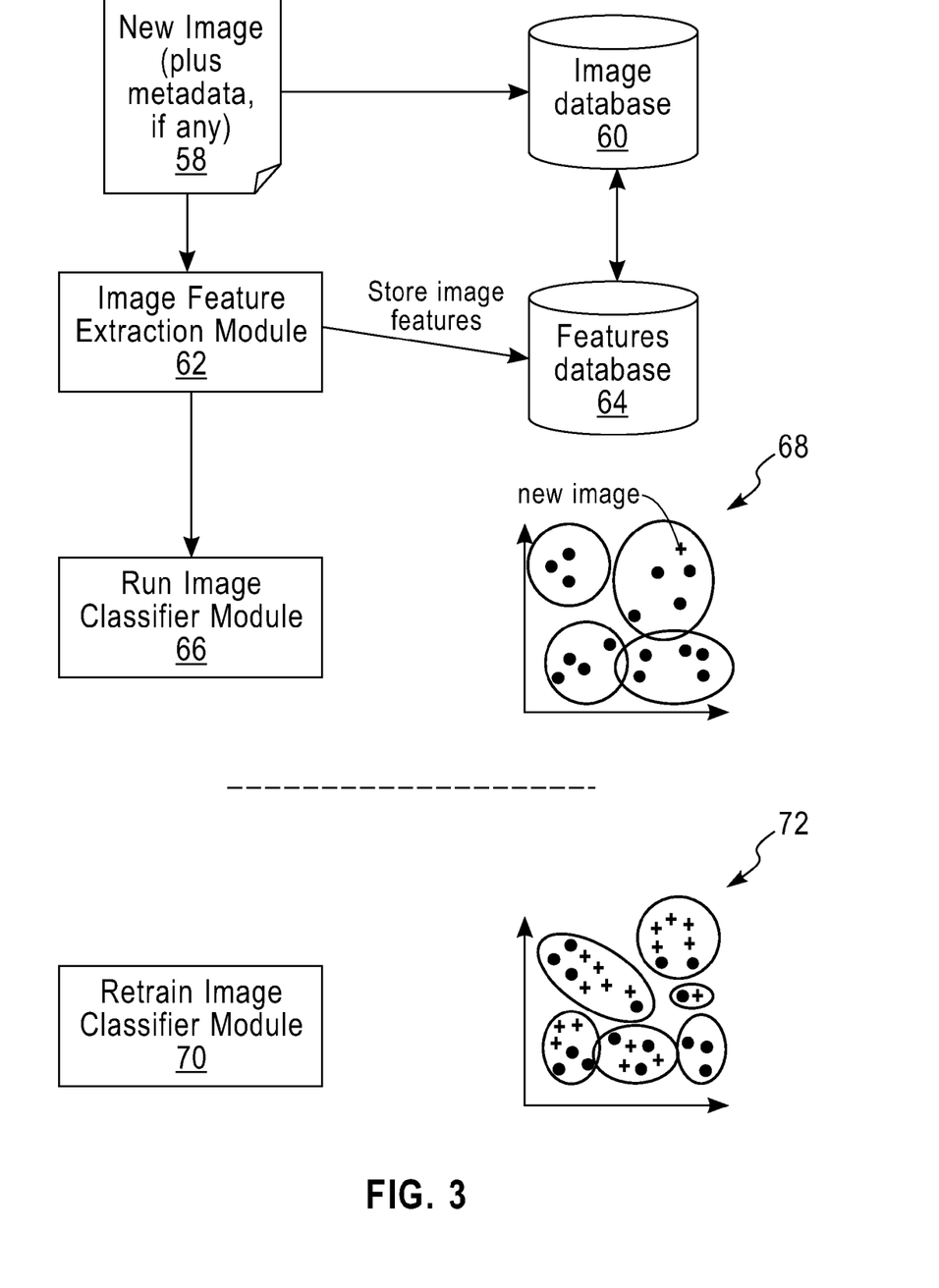
FIG. 3 is a block diagram of one embodiment of an image classifier of the invention.

FIG. 3 is a block diagram of an image classifier. New images 58, plus metadata are input into an image database 60. An image feature extraction module 62 extracts a set of features from the images and stores the features in a features database 64. The features associated with each image are, for example, a vector of pixels or color correlograms. A color correlogram feature distills the spatial correlation of colors. A color correlogram of an image is a table indexed by color pairs, where the k-th entry for hi_ji specifies the probability of finding a pixel of color j at a distance k from a pixel of color i in the image.

A classifier module 66 generates a classifier based on unsupervised learning algorithm. Unsupervised learning is trying to find hidden structure in unlabeled data. Approaches to unsupervised learning include clustering, such as, k-means, mixture models and hierarchical clustering. Unsupervised learning also includes approaches for learning latent variable models such as Expectation-maximization algorithm and method of moments, as well as blind signal separation techniques, such as, principal component analysis, independent component analysis, non-negative matrix factorization and singular value decomposition.

When a new image 58 is ingested into the system and stored in database 60, for example, provided by the user or crawled by the system, features are extracted by module 62 and saved in the database 64. The classifier module 66 applies the classifier to new image. A set of neighbor images of the new image is retrieved by the system. The graph 68 illustrates a spatial relationship of the new image shown by the + and the retrieved neighbors shown by the solid dots in graph 68. Metadata from the new image is inferred from neighbors, for example latitude and longitude data, which can be defined by an average of the neighbors, weighted by distance. A retrain image classifier module 70 periodically retrains the image classifier and the graph 72 shows the resultant new images and new neighbors. Neighborhood may also be defined based on non-spatial parameters. For example, two pictures may be similar if color occurs with similar frequencies.

Figure 4:
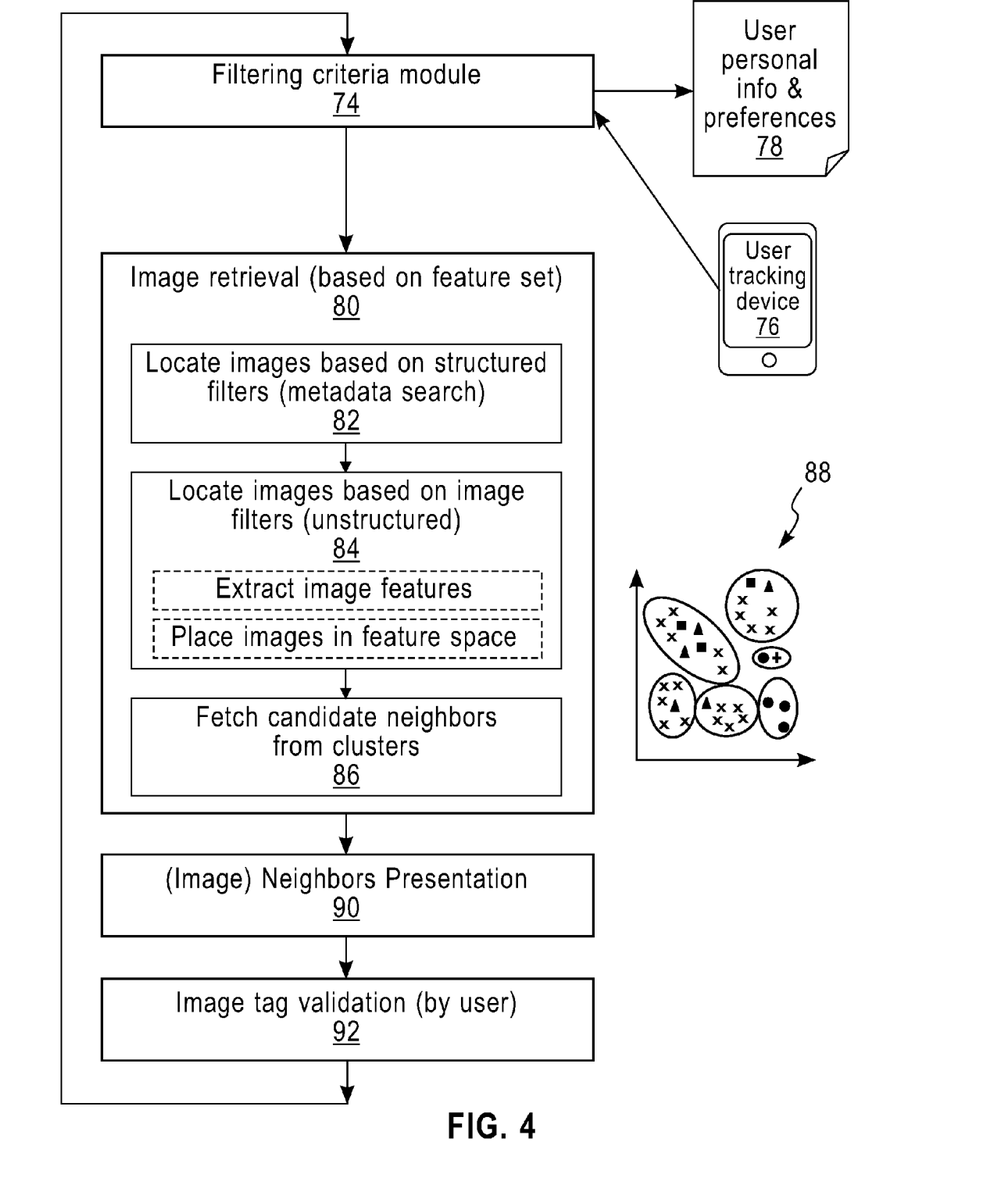
FIG. 4 is block diagram of one embodiment of an image search and metadata validation system of the present invention.

As shown in FIG. 4, the user provides filter criteria to a filtering criteria module. Examples of filter criteria are: spatial and temporal data and pictures. These data may be obtained, for example, from a user tracking device 76 and/or an interface 78 from which the user can input personal information and preferences. An image retrieval module conducts searches on the web retrieves a set of relevant matches for the search filters. A sub-module 82 locates images based on structured filters such as a metadata search and places the images in feature space. Sub-module 84 locates images based on unstructured image filters. Sub-module 84 extracts image features from the retrieved images and places the images in feature space. Sub-module 86 fetches candidate neighbors from the feature clusters generated by the image classifier and places the neighbor images in feature space.

Graph 88 illustrates the positioning of these images in feature space. The squares indicate matches based on metadata from module 82. The triangles indicate matches based on feature extraction from module 84. The x's indicate the candidate neighbors from module 86. The black dots indicate an absence of matching, for example, they are so distant and different from the input that they are not presented to the user.

A presentation module 90 presents the set of relevant matches to the user. Validation module 92 asks the user to validate the metadata inferred from the neighbors and tags the images validated by the user. Module 92 also asks users to provide new metadata for the matches that the user is aware of. This is especially helpful for matches which are not as relevant as the others, for example, matches obtained based solely on a subset of filter criteria. Validation module 92 adds the new metadata to the filtering criteria module 74 for future searches.

The new media images are stored in database 60 and incorporated into the set of images selected for training the classifier. The classifier is then retrained using the new media images. Retraining does not necessarily happen immediately after each user session. For example, the system can perform retraining just once per day or once per week.

Figure 5:
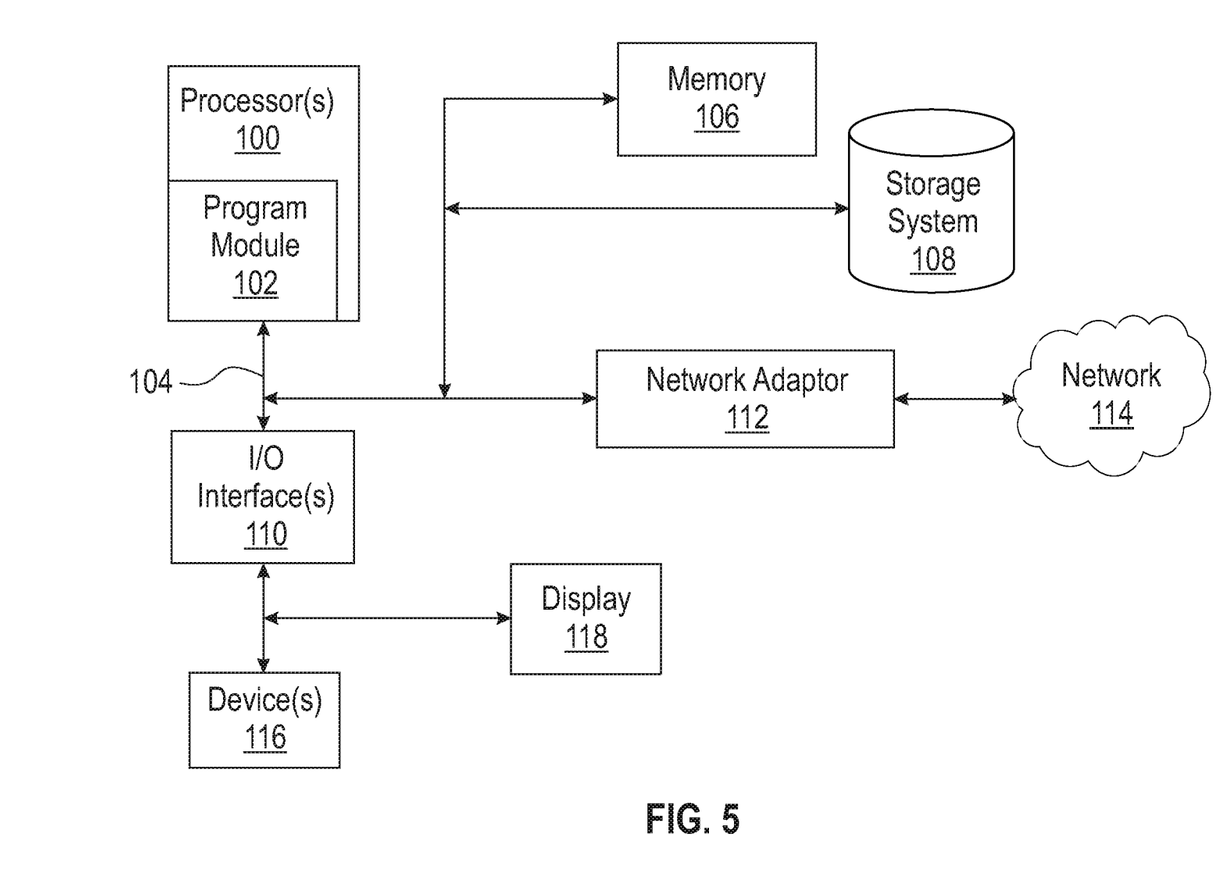
FIG. 5 is a block diagram of an exemplary computing system suitable for implementation of this invention.

FIG. 5 illustrates a schematic of an example computer or processing system that may implement the method for the identification of personal presence and enrichment of metadata in image media in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A method for the identification of personal presence and enrichment of metadata in image media, comprising:
    obtaining from a user time and location information of the presence of the user at a specific location;
    storing one or more images of the specific location obtained from the user in an image database;
    performing feature extraction on the one or more user obtained images, including generating a classifier for each extracted feature using an unsupervised learning algorithm;
    searching one or more media databases for candidate image media related to the specific location based on the location and time information, the candidate image media not necessarily being uploaded to the databases by the user;
    filtering the candidate image media based on known metadata of the candidate image media that matches the location and time information and
    filtering the candidate image media based on the feature extraction on the one or more user obtained images to provide filtered candidate image media, including applying the classifier to the candidate image media and retrieving a set of neighbor images from the image database based on metadata of the candidate image media;
    storing the filtered candidate image media in the image database;
    presenting to the user the filtered candidate image media;
    receiving an input from the user indicating whether or not the user can confirm the presence of the user in the filtered candidate image media;
    receiving from the user new metadata for the filtered candidate image media, the new metadata providing information not present in metadata of the metadata related image media;
    storing the new metadata in the image database;
    inferring metadata for the filtered candidate image media based on the new metadata, including inferring metadata from metadata of the set of neighbor images;
    presenting the inferred metadata for the filtered candidate image media to the user;
    receiving an input from the user indicating whether or not the user can confirm the validity of the inferred metadata; and
    storing in the image database the inferred metadata for the filtered candidate image media confirmed by the user to be valid.

2. The method of claim 1, wherein obtaining from a user time and location information of the presence of the user at a location includes obtaining tracking information from a mobile device in the possession of the user.

3. The method of claim 1, further including applying the classifier to a newly stored image obtained from the user, the newly stored image having at least location metadata, retrieving a set of neighbor images from the image database based on the location metadata of the newly stored image and inferring metadata for the newly stored image from metadata of the set of neighbor images.

4. The method of claim 3, further including presenting the inferred metadata for the newly stored image to the user and receiving an input from the user indicating whether or not the user can confirm the validity of the new metadata for the newly stored image and storing in the image database the inferred metadata for the newly stored image confirmed by the user to be valid.

5. The method of claim 1, wherein filtering the candidate image media based on the feature extraction includes performing image recognition.

6. The method of claim 1, wherein searching one or more media databases includes searching databases identified by the user.

7. The method of claim 5, further including presenting a message to the user indicating the presence of the user in the filtered candidate image media as a result of the image recognition.

8. A non-transitory article of manufacture tangibly embodying computer readable instructions, which when implemented, cause a computer to perform the steps of a method for the identification of personal presence and enrichment of metadata in image media, the method comprising:
obtaining from a user time and location information of the presence of the user at a specific location;
storing one or more images of the specific location obtained from the user in a image database;
performing feature extraction on the one or more user obtained images, including generating a classifier for each extracted feature using an unsupervised learning algorithm;
searching one or more media databases for candidate image media related to the specific location based on the location and time information, the candidate image media not necessarily being uploaded to the databases by the user; filtering the candidate image media based on known metadata of the candidate image media that matches the location and time information and filtering the candidate image media based on the feature extraction on the one or more user obtained images to provide filtered candidate image media, including applying the classifier to the candidate image media and retrieving a set of neighbor images from the image database based on metadata of the candidate image media;
storing the filtered candidate image media in the image database;
presenting to the user the filtered candidate image media;
receiving an input from the user indicating whether or not the user can confirm the presence of the user in the filtered candidate image media;
receiving from the user new metadata for the filtered candidate image media, the new metadata providing information not present in metadata of the metadata related image media;
storing the new metadata in the image database;
inferring metadata for the filtered candidate image media based on the new metadata, including inferring metadata from metadata of the set of neighbor images;
presenting the inferred metadata for the filtered candidate image media to the user;
receiving an input from the user indicating whether or not the user can confirm the validity of the inferred metadata; and
storing in the image database the inferred metadata for the filtered candidate image media confirmed by the user to be valid.

9. The non-transitory article of manufacture of claim 8, wherein obtaining from a user time and location information of the presence of the user at a location includes obtaining tracking information from a mobile device in the possession of the user.

10. The non-transitory article of manufacture of claim 8, further including applying the classifier to a newly stored image obtained from the user, the newly stored image having at least location metadata, retrieving a set of neighbor images from the image database based on the location metadata of the newly stored image and inferring metadata for the newly stored image from metadata of the set of neighbor images.

11. The non-transitory article of manufacture of claim 10, further including presenting the inferred metadata for the newly stored image to the user and receiving an input from the user indicating whether or not the user can confirm the validity of the new metadata for the newly stored image and storing in the image database the inferred metadata for the newly stored image confirmed by the user to be valid.

12. The non-transitory article of manufacture of claim 8, wherein filtering the candidate image media based on the feature extraction includes performing image recognition and the method further includes presenting a message to the user indicating the presence of the user in the filtered candidate image media as a result of the image recognition.

13. The non transitory article of manufacture of claim 8, wherein searching one or more media databases includes searching databases identified by the user.

14. A computer system for the identification of personal presence and enrichment of metadata in image media, the computer system comprising:
one or more computer processors;
one or more non-transitory computer-readable storage media;
program instructions, stored on the one or more non-transitory computer-readable storage media, which when implemented by the one or more processors, cause the computer system to perform the steps of:
obtaining from a user time and location information of the presence of the user at a specific location;
storing one or more images of the specific location obtained from the user in a image database;
performing feature extraction on the one or more user obtained images, including generating a classifier for each extracted feature using an unsupervised learning algorithm;
searching one or more media databases for candidate image media related to the specific location based on the location and time information, the candidate image media not necessarily being uploaded to the databases by the user; filtering the candidate image media based on known metadata of the candidate image media that matches the location and time information and filtering the candidate image media based on the feature extraction on the one or more user obtained images to provide filtered candidate image media, including applying the classifier to the candidate image media and retrieving a set of neighbor images from the image database based on metadata of the candidate image media;
storing the filtered candidate image media in the image database;
presenting to the user the filtered candidate image media;
receiving an input from the user indicating whether or not the user can confirm the presence of the user in the filtered candidate image media;

receiving from the user new metadata for the filtered candidate image media, the new metadata providing information not present in metadata of the metadata related image media;

storing the new metadata in the image database;

inferring metadata for the filtered candidate image media based on the new metadata, including inferring metadata from metadata of the set of neighbor images;

presenting the inferred metadata for the filtered candidate image media to the user;

receiving an input from the user indicating whether or not the user can confirm the validity of the inferred metadata; and storing in the image database the inferred metadata for the filtered candidate image media confirmed by the user to be valid.

15. The computer system of claim 14, wherein obtaining from a user time and location information of the presence of the user at a location includes obtaining tracking information from a mobile device in the possession of the user.

16. The computer system of claim 14, further including applying the classifier to a newly stored image obtained from the user, the newly stored image having at least location metadata, retrieving a set of neighbor images from the image database based on the location metadata of the newly stored image and inferring metadata for the newly stored image from metadata of the set of neighbor images.

17. The computer system of claim 16, further including presenting the inferred metadata for the newly stored image to the user and receiving an input from the user indicating whether or not the user can confirm the validity of the new metadata for the newly stored image and storing in the image database the inferred metadata for the newly stored image confirmed by the user to be valid.

18. The computer system of claim 14, wherein filtering the candidate image media based on the feature extraction includes performing image recognition and the method further includes presenting a message to the user indicating the presence of the user in the filtered candidate image media as a result of the image recognition.

19. The computer system of claim 14, wherein searching one or more media databases includes searching databases identified by the user.

* * * * *